US009042354B2

(12) United States Patent
Tong et al.

(10) Patent No.: US 9,042,354 B2
(45) Date of Patent: May 26, 2015

(54) CONTROLLING STATIONS' ACCESS TO A COMMUNICATIONS MEDIUM

(75) Inventors: Fei Tong, Royston (GB); Mark Gorthorn Rison, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 217 days.

(21) Appl. No.: 13/416,341

(22) Filed: Mar. 9, 2012

(65) Prior Publication Data

US 2013/0235850 A1     Sep. 12, 2013

(51) Int. Cl.
*H04W 72/04* (2009.01)
*H04L 12/64* (2006.01)
*H04W 74/00* (2009.01)

(52) U.S. Cl.
CPC ......... *H04L 12/6418* (2013.01); *H04W 74/006* (2013.01)

(58) Field of Classification Search
CPC ............ H04W 74/08–74/0891; H04L 12/6418
USPC .................. 370/445–448, 312, 390
See application file for complete search history.

(56) References Cited

U.S. PATENT DOCUMENTS

| | | | |
|---|---|---|---|
| 6,710,729 B1 | 3/2004 | Chen | |
| 7,573,837 B1* | 8/2009 | Mangal et al. | 370/260 |
| 7,855,956 B2* | 12/2010 | Zhang | 370/230 |
| 2005/0058151 A1* | 3/2005 | Yeh | 370/445 |
| 2009/0097436 A1* | 4/2009 | Vasudevan et al. | 370/328 |
| 2011/0069628 A1* | 3/2011 | Liu et al. | 370/252 |
| 2013/0114491 A1* | 5/2013 | Kim et al. | 370/312 |

FOREIGN PATENT DOCUMENTS

| | | |
|---|---|---|
| EP | 0369630 | 5/1990 |
| EP | 0645893 | 3/1995 |
| JP | 07-107101 | 4/1995 |

OTHER PUBLICATIONS

GB Search Report for GB Appln. No. 1218492.5, dated Dec. 18, 2013.
GB Search Report for GB Application No. 1303506.8, dated Aug. 27, 2013.

* cited by examiner

*Primary Examiner* — Khaled Kassim
*Assistant Examiner* — Zhaohui Yang
(74) *Attorney, Agent, or Firm* — RatnerPrestia (57) ABSTRACT

Managing access to a time-slotted communications medium by masking interrogatory codes that are contained in signals demarcating time slots of the medium and comparing the masked interrogatory codes against masked response codes. Access to the medium is dependent on the outcome of these comparisons.

28 Claims, 5 Drawing Sheets

FIG. 5

CONTROLLING STATIONS' ACCESS TO A COMMUNICATIONS MEDIUM

FIELD

The invention relates to communications systems in which transmitters compete for access to a transmission medium.

BACKGROUND

The Institute of Electrical and Electronic Engineers (IEEE) 802.11, standards address systems in which a number of stations (STAs) compete to conduct communications via the resources of an access point (AP). In this context, the IEEE 802.11, standards specify a medium access control sub-layer (a "MAC") that is a carrier sense multiple access with collision avoidance (CSMA/CA) based medium access scheme; when the number of STAs contending for the medium is very large, there will be a high probability of collisions and the spectrum is wasted by the failed transmissions. The network throughput and packet transfer delay are degraded dramatically.

There are some techniques that can potentially solve this problem. Some of them are based on centrally-scheduled medium access; some techniques adapt the back-off window to match the number of STAs, which then reduces the probability of two STAs throwing the same random back-off value; other techniques are based on grouping STAs and only allowing STAs in the same group to contend for the medium. However, for these techniques to work, the AP needs to know how many STAs are in the network, and this information is not available until STAs finish their initial association.

When a large number of STAs is trying to associate with the AP simultaneously (with a short period of time of arrival difference, e.g. after a wide-area power cut), there is increased probability that the STAs will collide with each other and the medium could be congested. If the AP tunes the parameters, such as back-off window size or number of groups, assuming a large number of STAs, the network throughput can also be compromised due to waste of spectrum resource in waiting for non-existent STAs contending for medium. Therefore, there is a need for a scheme to manage the contentions from a potentially large number of STAs and a need for a scheme can to manage contentions before, as well as after, association.

SUMMARY

According to one aspect, an embodiment of the invention provides a method of controlling access of a station to a communications medium that is divided into time slots, the method comprising: a controller of the medium transmitting demarcation signals at regular intervals, each demarcation signal demarcating a respective time slot and containing one or more interrogatory codes; the station receiving a demarcation signal corresponding to a particular time slot; the station masking each of the one or more interrogatory codes from the received demarcation signal with a control mask to produce for each interrogatory code a respective masked interrogatory code; the station masking a response code held by the station with the control mask to produce a masked response code; and the station barring itself from attempting to access the communications medium in the particular time slot if none of the one or more masked interrogatory codes matches the masked response code. The invention thus can provide a way of controlling when a station will attempt to access a communications medium and, by extension, a way of controlling when groups of stations will attempt to access a communications network.

According to another aspect, an another embodiment of the invention provides a method of operating a station intended to access a communications medium that is divided into time slots by demarcation signals transmitted from a controller at regular intervals, wherein each demarcation signal demarcates a respective time slot and contains one or more interrogatory codes and the method comprises: the station receiving a demarcation signal corresponding to a particular time slot; the station masking each of the one or more interrogatory codes from the received demarcation signal with a control mask to produce for each interrogatory code a respective masked interrogatory code; the station masking a response code held by the station with the control mask to produce a masked response code; and the station barring itself from attempting to access the communications medium in the particular time slot if none of the one or more masked interrogatory codes matches the masked response code. The invention thus can provide a way of controlling when a station will attempt to access a communications medium and, by extension, a way of controlling when groups of stations will attempt to access a communications network.

A method according to either aspect may further comprise the station joining a network maintained by the controller and the controller in response transmitting to the station a control signal that contains the response code. The control mask may, for example, be provided in, and by obtained from, the control signal. In another variant, a first mask is provided in the control signal, a second mask is provided in the demarcation signal that corresponds to the particular time slot, the first and second masks are binary words of equal length containing bits in a one of a one state and a zero state and the method further comprises selecting the one of the first and second masks that contains the most bits in the zero state to be the control mask.

In a method according to either of the stated aspects, it may be the case that each demarcation signal contains a mask. In some variants, the mask contained in the demarcation signal that corresponds to the particular time slot is used by the station as the control mask. In other variants, the station derives the control mask from the mask that is contained in the demarcation signal that corresponds to the particular time slot. In the case where the mask contained in the demarcation signal that corresponds to the particular time slot is a binary word containing bits in a one of a one state and a zero state, the deriving of the control mask can for example comprise the station changing from a zero state to a one state one or more bits in that binary word.

In some embodiments, the controller chooses from a group of predetermined codes the one or more interrogatory codes that are contained in each demarcation signal.

According to a yet further aspect, an embodiment of the invention provides a station for accessing a communications medium that is divided into time slots by demarcation signals transmitted from a controller at regular intervals, wherein each demarcation signal demarcates a respective time slot and contains one or more interrogatory codes and the station comprises: a receiver for receiving signals from the controller; storage means for storing a response code; and processing means. The processing means is arranged to: recover one or more interrogatory codes from a demarcation signal received at the receiver and corresponding to a particular time slot of the medium; mask each of the one or more interrogatory codes from the received demarcation signal with a control mask to produce for each interrogatory code a respective masked interrogatory code; mask the response code from the memory with the control mask to produce a masked response code; and bar the station from attempting to access the communications medium in the particular time slot if none of the one or more masked interrogatory codes matches the masked response code. The invention thus can provide a way of controlling when a station will attempt to access a communications medium and, by extension, a way of controlling when groups of stations will attempt to access a communications network.

In certain embodiments, the processing means is further arranged to recover the response code from a control signal that received at the receiver from the controller as a consequence of the station joining a network maintained by the controller. In some variants of such embodiments, the processing means is further configured to recover the control mask from the control signal. In other variants, a first mask is provided in the control signal, a second mask is provided in the demarcation signal that corresponds to the particular time slot, the first and second masks are binary words of equal length containing bits in a one of a one state and a zero state and the processing means is further arranged to select the one of the first and second masks that contains the most bits in the zero state to be the control mask.

Each demarcation signal may contain a mask and, in some variants, the processing means may be further arranged to use the mask contained in the demarcation signal that corresponds to the particular time slot as the control mask. In other variants, however, the processing means may be further configured to derive the control mask from the mask that is contained in the demarcation signal that corresponds to the particular time slot. In the case where the mask contained in the demarcation signal that corresponds to the particular time slot is a binary word containing bits in a one of a one state and a zero state, the processing means can be configured to derive the control mask by changing from a zero state to a one state one or more bits in the binary word.

The control mask, the response code and the one or more interrogatory codes can be binary words.

The response code may be created by hashing a MAC address of the station. The response code may be a random number.

According to yet another aspect, there are no control masks and an embodiment of the invention provides a method of controlling access of a station to a communications medium that is divided into time slots, the method comprising: a controller of the medium transmitting demarcation signals at regular intervals, each demarcation signal demarcating a respective time slot and containing one or more interrogatory codes; the station receiving a demarcation signal corresponding to a particular time slot; and the station barring itself from attempting to access the communications medium in the particular time slot if none of the one or more interrogatory codes matches the response code. The invention thus can provide a way of controlling when a station will attempt to access a communications medium and, by extension, a way of controlling when groups of stations will attempt to access a communications network.

According to a still further aspect, there are no control masks and an embodiment of the invention provides a method of operating a station intended to access a communications medium that is divided into time slots by demarcation signals transmitted from a controller at regular intervals, wherein each demarcation signal demarcates a respective time slot and contains one or more interrogatory codes and the method comprises: the station receiving a demarcation signal corresponding to a particular time slot; and the station barring itself from attempting to access the communications medium in the particular time slot if none of the one or more interrogatory codes matches the response code. The invention thus can provide a way of controlling when a station will attempt to access a communications medium and, by extension, a way of controlling when groups of stations will attempt to access a communications network.

According to a still further aspect, an embodiment of the invention provides a station for accessing a communications medium that is divided into time slots by demarcation signals transmitted from a controller at regular intervals, wherein each demarcation signal demarcates a respective time slot and contains one or more interrogatory codes and the station comprises: a receiver for receiving signals from the controller; storage means for storing a response code; and processing means. The processing means is arranged to: recover one or more interrogatory codes from a demarcation signal received at the receiver and corresponding to a particular time slot of the medium; and bar the station from attempting to access the communications medium in the particular time slot if none of the one or more interrogatory codes matches the response code. The invention thus can provide a way of controlling when a station will attempt to access a communications medium and, by extension, a way of controlling when groups of stations will attempt to access a communications network.

By way of example only, certain embodiments will now be described by reference to the accompanying drawings, in which.

DETAILED DESCRIPTION

Figure 1:
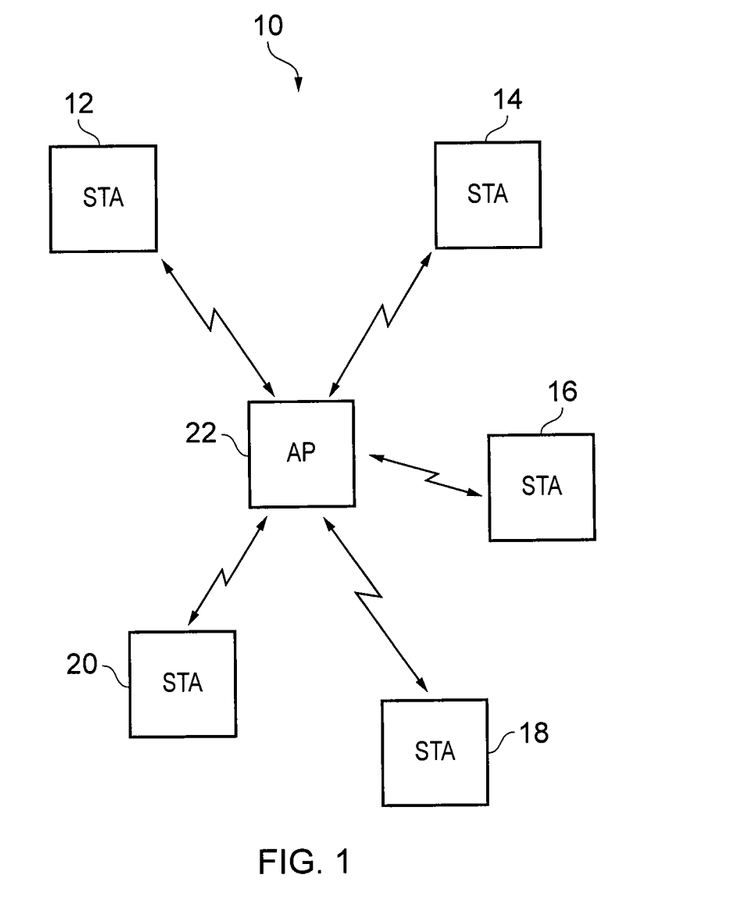
FIG. 1 is a block diagram schematically illustrating a network.

FIG. 1 illustrates a network 10 in which five STAs 12, 14, 16, 18 and 20 compete using a CSMA/CA MAC scheme in order to conduct communications using the resources provided by the AP 22. It will be readily apparent that there could be more or fewer than five STAs in the network. The AP 22 could, for example, be a wireless router providing a WiFi network and the STAs 12-20 could, for example, be laptops, smart phones, printers or tablet computers that wish to conduct communications via the AP's WiFi network.

The AP 22 provides a communications medium through which the STAs 12-20 can attempt to conduct communications. The communications medium provided by the AP 22 is divided into time slots. The beginning of each slot is demarcated by a beacon frame. Each slot is given a group number, denoted v, that is eight bits long, and a mask, denoted m, that is also eight bits long. A slot's group number and its mask are communicated in its beacon frame. The AP 22 may arbitrarily change one or both of m and v for every slot to adjust the number of STAs that are allowed to contend for access to the medium in each slot. The adjustment of m and v can be based on observations of the medium made by the AP 22, on parameters such as extended interframe space (EIFS), packet error rate (PER) and clear channel assessment (CCA).

In order to conduct communications using the resources of the AP 22, the STAs 12-20 need to "associate" with the AP 22. That is to say, the STAs 12-20 must identify themselves to, and submit to the control of, the AP 22. After the STAs 12-20 are associated with the AP 22, then the STAs 12-20 can conduct communications using the resources of the AP 22 as represented by the communications medium. The STAs 12-20 will contend for the use of the communications medium at various times, and it is possible (and indeed expected) that there will be occasions where several of the STAs 12-20 attempt to use the medium simultaneously. A STA, is said to experience a "collision" if it attempts to access the medium and discovers that the medium is already in use by another one of the stations, say STA. A STA that experiences a collision, will "back off", that is to say, it will attempt to access the medium at some later time instead.

The process by which a STA 12-20 contends for access to the communications medium provided by the AP 22 will now be discussed from the standpoint of STA 12. It is to be understood that the other STAs 14-20 behave in the same way.

Before association with the AP 22, STA 12 generates an 8-bit random number, denoted rv. As will be discussed later, the STA 12 does not change this value until after successful association with the AP 22. The STA 12 only contends for the medium if (where 'and' denotes 'bitwise and'):

$$\text{rv and m=v and m} \qquad \text{condition } \textcircled{1}$$

Once the STA 12 becomes associated with the AP 22, the AP 22 specifies a new rv value, denoted rv', for the STA 12 to use after association. The value rv' does not change unless the AP 22 updates it using a new action frame sent to the STA 12. (action frames are defined within the IEEE 802.11, standards.) After association with the AP 22, the STA 12 does not contend for the medium during a given slot unless it has received a beacon frame in that slot and (where 'and' denotes 'bitwise and'):

$$\text{rv' and m=v and m} \qquad \text{condition } \textcircled{2}$$

The STA 12, is allowed, both before and after association, to make autonomous adjustments to the mask so that the STA 12 can reduce its contention to the medium and therefore reduce its overall collision probability without the intervention of the AP 22. This seemingly self-sacrificing behaviour by STA 12 can improve the overall communications throughput of the network 10 as well as the individual access delay, in a statistically-averaged sense, that is experienced by the STA 12. The autonomous adjustment that the STA 12 is permitted to make is the changing of zero bits in the mask to ones, in which case the mask m is modified and becomes a mask denoted m'. If the STA 12 has made such a change, then in a given slot, and prior to association of the STA 12 with the AP22, the STA 12 will only contend for the medium if (where 'and' denotes 'bitwise and'):

$$\text{rv and m'=v and m'} \qquad \text{condition } \textcircled{3}$$

Of course, if the STA 12 has become associated with the AP 22 and the AP has modified rv to rv', then condition ③, becomes:

$$\text{rv' and m'=v and m'} \qquad \text{condition } \textcircled{4}$$

A simple way for the STA 12 to modify its mask is to identify the zero bit nearest its least significant bit (LSB) end and then set that bit to one. For example, if one assumes that m=00010101, and that the LSB is at the right-hand end, then m'=00010111. Other schemes are of course possible for choosing which additional bit to set to one. For example, the bit to alter could be found by searching from the most significant bit (MSB) end rather than the LSB end.

It is also possible for the network 10 to be configured to allow STA 12 to change multiple zero bits into ones at the same time. It is also possible for the network 10 to be configured to allow the STA 12 to take a modified mask m' created for use with one beacon frame and make a further adjustment to the mask, by setting one or more zero bits to one, when using that mask with a subsequent beacon frame.

From one perspective, a beacon frame can be thought of as a demarcation signal since it demarcates the time slots of the communications medium. Similarly, the group number sent in a beacon frame can be thought of as an interrogatory code since it is used by the STA 12 to query whether the STA can contend for access to the medium, and the rv value or, as the case may be, the rv' value can be thought of as a response code since it governs the STA's response to the group number as provided by the evaluation of the relevant one of conditions ①, to ④, . Moreover, the mask that is used in the evaluation of the relevant condition (m, m' or, as will be discussed later, m") can be thought of as a control mask since it controls the comparison of the interrogatory code with the group code. Assuming that the control mask, the interrogatory code and the response code are all equal in length, the more bits that are set to one in the control mask, less likely it becomes that the STA 12 will be permitted to contend for access to the communications medium in a given time slot.

That concludes the explanation of the mechanism by which the STA 12 contends for access to the communications medium provided by the AP 20. The other STAs 14-20 use the same way of contending for access to the communications medium.

Figure 2:
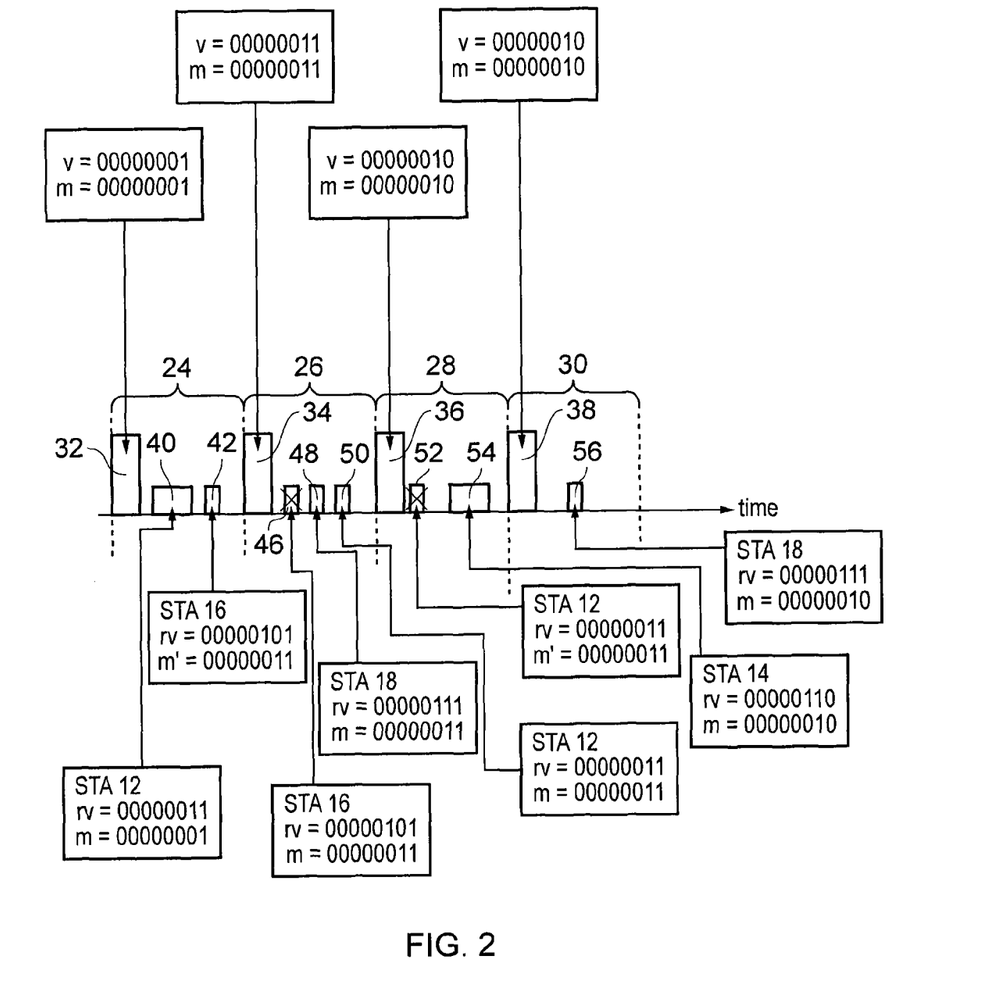
FIG. 2 is a timing diagram explaining some activity in the network of FIG. 1.

FIG. 2 provides an example of a scenario where the STA 12-20 compete for access to the medium. FIG. 2 shows four consecutive slots in the communications medium. The slots are demarcated by their respective beacon frames 24, 26, 28 and 30, which are broadcast by the AP 22.

FIG. 2 illustrates the network 10 in action. FIG. 2 shows as an exemplary scenario a snapshot of four consecutive time slots 24, 26, 28 and 30 in the medium, during which four of the five STAs 12-20 happen to compete for access to the medium. Each of the time slots 24-30 commences with a respective beacon frame 32, 34, 36 and 38. The activity within these time slots will now be discussed.

Time Slot 24

During the course of this time slot, it happens that just STAs 12 and 16 decide to contend for access to the medium. In this time slot, beacon frame 32 sets v=00000001, and m=00000001.

STA 12 has rv=00000011, and uses m as assigned by the beacon frame 32. In this instance:

$$\text{rv and m=v and m}$$

so the STA 12 is allowed to contend for access to the medium in this time slot, and this contention is indicated by block 40.

STA 16 has rv=00000101, and, in view of the fact that it experienced a collision the last time that it attempted to access the medium, STA 16 elects to use in this time slot a modified mask m'=00000011, in place of m=00000001. In this instance:

$$\text{rv and m'=v and m'}$$

so the STA 16 is allowed to contend for access to the medium in this time slot, and this contention is indicated by block 42.

Time Slot 26

During the course of this time slot, it happens that just STAs 12, 16 and 18 decide to contend for access to the medium. In this time slot, beacon frame 34 sets v=00000011, and m=00000011.

STA 16 has rv=00000101, and uses m as assigned by the beacon frame 34. In this instance:

$$rv \text{ and } m \neq v \text{ and } m$$

so the STA 16 is not allowed to contend for access to the medium in this time slot, and this prohibition is indicated by struck-through block 46.

STA 18 has rv=00000111, and uses m as assigned by the beacon frame 34. In this instance:

$$rv \text{ and } m = v \text{ and } m$$

so the STA 18 is allowed to allowed to contend for access to the medium in this time slot, and this contention is indicated by block 48.

STA 12 has rv=00000011,, it will be recalled, and in this time slot elects to use m as assigned by the beacon frame 34. In this instance:

$$rv \text{ and } m = v \text{ and } m$$

so the STA 12 is allowed to allowed to contend for access to the medium in this time slot, and this contention is indicated by block 50.

Time Slot 28

During the course of this time slot, it happens that just STAs 12 and 14 decide to contend for access to the medium. In this time slot, beacon frame 36 sets v=00000010, and m=00000010.

It so happens that STA 12 experienced a collision (with some other activity that is not shown in the Figure) when contending for access to the medium in time slot 26, and therefore elects to use in this time slot a modified mask m'=00000011, in place of m=00000010. STA 12 has rv=00000011,, it will be recalled, so, in this instance:

$$rv \text{ and } m' \neq v \text{ and } m'$$

so the STA 12 is not allowed to contend for access to the medium in this time slot, and this prohibition is indicated by struck-through block 52.

STA 14 has rv=00000110, and uses m as assigned by the beacon frame 36. In this instance:

$$rv \text{ and } m = v \text{ and } m$$

so the STA 14 is allowed to allowed to contend for access to the medium in this time slot, and this contention is indicated by block 54.

Time Slot 30

During the course of this time slot, it happens that only STA 18 decides to contend for access to the medium. In this time slot, beacon frame 38 sets v=00000010, and m=00000010.

STA 18 has rv=00000111,, it will be recalled, and elects to use m as assigned by the beacon frame 32. In this instance:

$$rv \text{ and } m = v \text{ and } m$$

so the STA 18 is allowed to contend for access to the medium in this time slot, and this contention is indicated by block 56.

That concludes the description of the activity in the four time slots 24-30. In the scenario shown in FIG. 2, the STAs 12-18 are not associated with the AP 22; if they were so associated, then the relevant occurrences of legend rv in that Figure would be replaced with rv'.

The operation of the network 10 as described above with reference to FIGS. 1 and 2 is useful in that it provides a way of controlling the times at which groups of STAs contend for access to the medium prior to association.

The operation of the network 10 as described above with reference to FIGS. 1 and 2 is useful in that it provides a way of controlling the times at which STAs contend for access to the medium after association.

The method of operating network 10 as described above with reference to FIGS. 1 and 2 is useful in that it can cope with large numbers of STAs contending for access to the medium.

Figure 3:
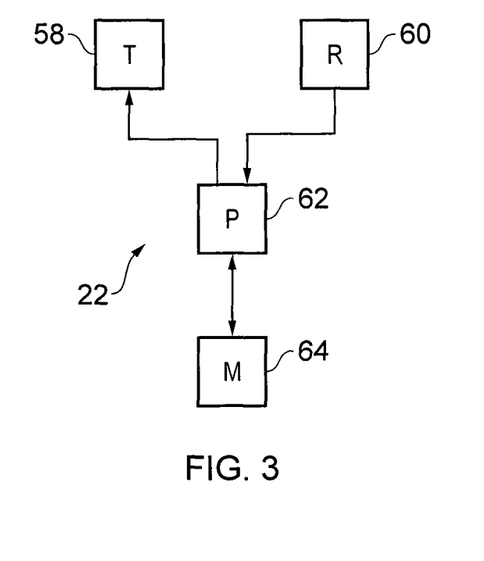
FIG. 3 is a block diagram schematically illustrating the access point of the network shown in FIG. 1.

FIG. 3 shows the AP 22. In FIG. 3, only the features of the AP 22 that are most useful for describing the invention are shown. The skilled person will readily understand that in practice the AP 22 will include many more elements besides those shown in FIG. 3. As shown in FIG. 3, the AP 22 comprises a transmitter 58, a receiver 60, a processor 62 and a memory 64. The transmitter 58 receives communications (such as requests from the STAs 12-20 for access to the communications medium provided the AP 22) from the network 10 and these are processed by processor 62 with the aid of instructions and data that are retrieved from the memory 64. The processor 62 can also store data and instructions in the memory 64. The processor 62 can transmit communications (such as beacon frames containing m and v values for the STAs 12-20 to use, or such as action frames containing rv' and/or m" values for a STA to use) into the network 10 via the transmitter 58.

Figure 4:
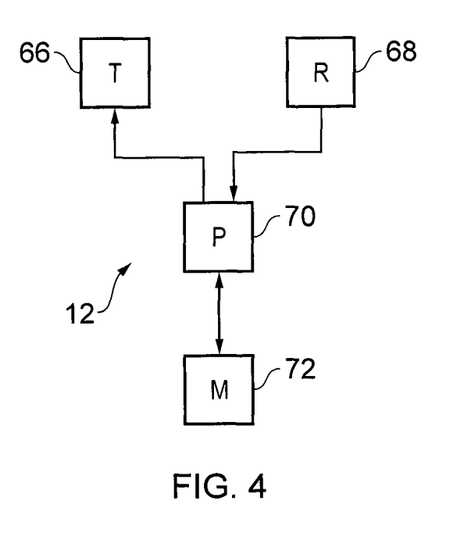
FIG. 4 is a block diagram schematically illustrating a station of the network shown in FIG. 1.

FIG. 4 shows the STA 12. In FIG. 4, only the features of the STA 12 that are most useful for describing the invention are shown. The skilled person will readily understand that in practice the STA 12 will include many more elements besides those shown in FIG. 4 and that STAs 14-20 can have the same design as STA 12. As shown in FIG. 4, the STA 12 comprises a transmitter 66, a receiver 68, a processor 70 and a memory 72. The transmitter 66 receives communications (such as beacon frames containing m and v values for the STA 12 to use, or such as action frames containing rv' and/or m" values for the STA 12) from the network 10 and these are processed by processor 70 with the aid of instructions and data that are retrieved from the memory 72. The processor 70 can also store data and instructions in the memory 72. The processor 70 can transmit communications (such as requests to the AP 22 for access to the communications medium provided the AP 22) into the network 10 via the transmitter 72.

Figure 5:
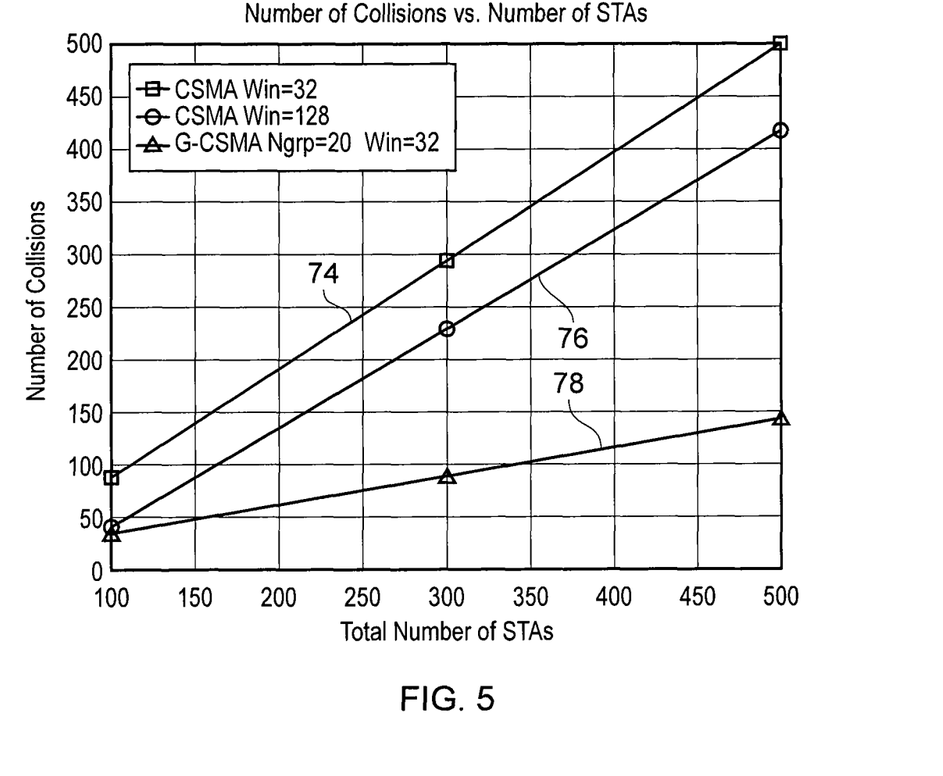
FIG. 5 is a plot illustrating the relative performance of difference types of medium access control schemes.

FIG. 5 shows the results of a Monte-Carlo simulation that was run to evaluate the benefit of allowing STAs to contend for medium access in groups, as in the scheme outlined with respect to FIGS. 1 and 2. In the simulation, a given number of STAs simultaneously contended for the medium to transmit one packet; once its packet was delivered successfully, a STA kept silent. In the simulation, three MAC schemes were evaluated:

data plot 74 shows the results for a basic distributed coordination function (DCF) with an initial back-off window size of 32.

data plot 76 shows the results for a basic DCF with an initial back-off window size of 128.

data plot 78 shows the results for a CSMA/CA scheme in which:

the STAs are divided into twenty equal sized groups.

the communications medium is divided into time slots.

only one of the groups is allowed to contend for access to the medium in each time slot, with the time slots repeatedly cycling through the twenty groups such that in the $n^{th}$, time slot, the $j^{th}$, group is allowed to contend, where j=n modulo p and n is an integer greater than or equal to one and p is the number of groups (twenty).

the STAs each have a fixed back-off window size of 32.

FIG. 5 shows that the number of collisions is reduced by grouping STAs before initial association (plot 78) indicating that the STA contention scheme described by reference to FIGS. 1 and 2 can reduce the number of contentions significantly.

Various modifications can be made to the MAC scheme described by reference to FIGS. 1 and 2, and some of these will now be discussed.

In one embodiment, rv is not a random number generated by the particular STA but instead is an eight bit hash of the STA's MAC address. In other embodiments, different pseudorandom values can be used for rv.

In one embodiment, the mask m can be given a simpler form, inasmuch as it can instead be specified as a number of bits, commencing from the LSB end or the MSB end of m, that are to be the only non-zero bits in m. For example, a beacon frame could signal the number "three", indicating that, for STAs that happen to contend in that beacon frame's time slot, m is an eight bit number with only the three LSBs set to one, i.e., m=00000111. In this variant, the previously stated rules for adapting m into m' can be used.

In one embodiment, the beacon frame includes a group of numbers v, and the STAs check the masked rv or, as the case may be, masked rv' against the list to decide whether it will contend in the beacon frame. A STA will be able to contend if it finds a number in the list for which is satisfied the one of conditions ①, to ④, that it is using.

In one embodiment, once a STA is associated with the AP 22, the AP 22 allocates that STA not only an rv' value but also a mask m" that the STA can opt to use in place of m in the evaluation of condition ②, , . In this embodiment, a STA will opt to use m" in place of m for evaluating condition ②, , unless m has fewer bits set to one than m". A STA's rv' and m" values do not change unless the AP 22 updates them using a new action frame sent to that STA. That is to say, a STA can modify m" by changing bits from zero to one. In a variant of this embodiment, however, a STA can modify m" by changing one or more bits from zero to one (which would reduce the probability that a STA contends in a given time slot), but not by changing one or more bits from one to zero (which would increase the probability that a STA contends in a given time slot).

In another variant, the control mask used by a STA is set to all ones, e.g. 11111111, in the case where the control mask is an eight bit word. This "all ones" state could be used in one or more STAs and could be used for a period or indefinitely. In relation to the latter option, in a further and related variant, there is no control mask such that conditions ①, and ③, both become rv=v and conditions ②, and ④, both become rv'=v.

The invention claimed is:

1. A method of controlling access of a station to a communications medium that is divided into time slots, the method comprising: a controller of the medium transmitting demarcation signals at regular intervals, each demarcation signal demarcating a respective time slot and containing one or more interrogatory codes; the station receiving a demarcation signal corresponding to a particular time slot; the station masking each of the one or more interrogatory codes from the received demarcation signal with a control mask to produce for each interrogatory code a respective masked interrogatory code; the station masking a response code generated by the station with the control mask to produce a masked response code; and the station barring itself from attempting to access the communications medium in the particular time slot if none of the one or more masked interrogatory codes matches the masked response code.

2. A method according to claim 1, wherein the response code is generated by hashing a MAC address of the station.

3. A method according to claim 1, wherein the response code is a random number.

4. A method according to claim 1, further comprising the station joining a network maintained by the controller and the controller in response transmitting to the station a control signal wherein the control mask is obtained from the control signal.

5. A method according to claim 4, wherein a first mask is provided in the control signal, a second mask is provided in the demarcation signal that corresponds to the particular time slot, the first and second masks are binary words of equal length containing bits in a one of a one state and a zero state and the method further comprises selecting the one of the first and second masks that contains the most bits in the zero state to be the control mask.

6. A method according to claim 1, wherein the control mask, the response code and the one or more interrogatory codes are binary words.

7. A method according to claim 1, wherein each demarcation signal contains a mask and the mask contained in the demarcation signal that corresponds to the particular time slot is used by the station as the control mask.

8. A method according to claim 1, wherein each demarcation signal contains a mask and the method further comprises the station deriving the control mask from the mask that is contained in the demarcation signal that corresponds to the particular time slot.

9. A method according to claim 8, wherein the mask contained in the demarcation signal that corresponds to the particular time slot is a binary word containing bits in a one of a one state and a zero state and the step of the station deriving the control mask comprises the station changing from a zero state to a one state one or more bits in the binary word.

10. A method according to claim 1, further comprising the controller choosing from a group of predetermined codes the one or more interrogatory codes that are contained in each demarcation signal.

11. A method of operating a station for accessing a communications medium that is divided into time slots by demarcation signals transmitted from a controller at regular intervals, wherein each demarcation signal demarcates a respective time slot and contains one or more interrogatory codes and the method comprises: the station receiving a demarcation signal corresponding to a particular time slot; the station masking each of the one or more interrogatory codes from the received demarcation signal with a control mask to produce for each interrogatory code a respective masked interrogatory code; the station masking a response code generated by the station with the control mask to produce a masked response code; and the station barring itself from attempting to access the communications medium in the particular time slot if none of the one or more masked interrogatory codes matches the masked response code.

12. A method according to claim 11, wherein the response code is generated by hashing a MAC address of the station.

13. A method according to claim 11, wherein the response code is a random number.

14. A method according to claim 11, further comprising the station joining a network maintained by the controller and consequently receiving from the controller a control signal, wherein the control mask is obtained from the control signal.

15. A method according to claim 14, wherein a first mask is provided in the control signal, a second mask is provided in the demarcation signal that corresponds to the particular time slot, the first and second masks are binary words of equal length containing bits in a one of a one state and a zero state and the method further comprises the station selecting the one of the first and second masks that contains the most bits in the zero state to be the control mask.

16. A method according to claim 11, wherein the control mask, the response code and the one or more interrogatory codes are binary words.

17. A method according to claim 11, wherein each demarcation signal contains a mask and the mask contained in the demarcation signal that corresponds to the particular time slot is used by the station as the control mask.

18. A method according to claim 11, wherein each demarcation signal contains a mask and the method further comprises the station deriving the control mask from the mask that is contained in the demarcation signal that corresponds to the particular time slot.

19. A method according to claim 18, wherein the mask contained in the demarcation signal that corresponds to the particular time slot is a binary word containing bits in a one of a one state and a zero state and the step of the station deriving the control mask comprises the station changing from a zero state to a one state one or more bits in the binary word.

20. A station for accessing a communications medium that is divided into time slots by demarcation signals transmitted from a controller at regular intervals, wherein each demarcation signal demarcates a respective time slot and contains one or more interrogatory codes and the station comprises: a receiver configured to receive signals from the controller; a memory containing a response code generated by the station; and a processor configured to:
 a. recover one or more interrogatory codes from a demarcation signal received at the receiver and corresponding to a particular time slot of the medium;
 b. mask each of the one or more interrogatory codes from the received demarcation signal with a control mask to produce for each interrogatory code a respective masked interrogatory code;
 c. mask the response code from the memory with the control mask to produce a masked response code; and
 d. bar the station from attempting to access the communications medium in the particular time slot if none of the one or more masked interrogatory codes matches the masked response code.

21. A station corresponding to claim 20, wherein the response code is a hash of a MAC address of the station.

22. A station according to claim 20, wherein the response code is a random number.

23. A station according to claim 20, wherein the processor is further configured to recover the control mask from a control signal that is received at the receiver from the controller as a consequence of the station joining a network maintained by the controller.

24. A station according to claim 23, wherein a first mask is provided in the control signal, a second mask is provided in the demarcation signal that corresponds to the particular time slot, the first and second masks are binary words of equal length containing bits in a one of a one state and a zero state and the processor is further configured to select the one of the first and second masks that contains the most bits in the zero state to be the control mask.

25. A station according to claim 20, wherein the control mask, the response code and the one or more interrogatory codes are binary words.

26. A station according to claim 20, wherein each demarcation signal contains a mask and the processor is further configured to use the mask contained in the demarcation signal that corresponds to the particular time slot as the control mask.

27. A station according to claim 20, wherein each demarcation signal contains a mask and the processor is further configured to derive the control mask from the mask that is contained in the demarcation signal that corresponds to the particular time slot.

28. A station according to claim 27, wherein the mask contained in the demarcation signal that corresponds to the particular time slot is a binary word containing bits in a one of a one state and a zero state and the processor is configured to derive the control mask by changing from a zero state to a one state one or more bits in the binary word.

* * * * *

UNITED STATES PATENT AND TRADEMARK OFFICE
CERTIFICATE OF CORRECTION

Page 1 of 2

PATENT NO. : 9,042,354 B2
APPLICATION NO. : 13/416341
DATED : May 26, 2015
INVENTOR(S) : Tong et al.

It is certified that error appears in the above-identified patent and that said Letters Patent is hereby corrected as shown below:

In the specification

In Column 1, Line 12, delete "802.11," and insert -- 802.11 --, therefor.

In Column 1, Line 15, delete "802.11," and insert -- 802.11 --, therefor.

In Column 4, Line 24, below Line 24, insert Heading -- BRIEF DESCRIPTION OF THE DRAWINGS --.

In Column 5, Line 28, delete "802.11," and insert -- 802.11 --, therefor.

In Column 5, Line 60, delete "m=00010101," and insert -- m=00010101 --, therefor.

In Column 6, Line 14, delete "①, to ④, ." and insert -- ① to ④ . --, therefor.

In Column 6, Line 25, delete "AP 20." and insert -- AP 22. --, therefor.

In Column 6, Line 43, delete "v=00000001," and insert -- v=00000001 --, therefor.

In Column 6, Line 45, delete "rv=00000011," and insert -- rv=00000011 --, therefor.

In Column 6, Line 53, delete "rv=00000101," and insert -- rv=00000101 --, therefor.

In Column 6, Line 55, delete "m'=00000011," and insert -- m'=00000011 --, therefor.

In Column 6, Line 66, delete "v=00000011," and insert -- v=00000011 --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 9,042,354 B2

In Column 7, Line 1, delete "rv=00000101," and insert -- rv=00000101 --, therefor.

In Column 7, Line 8, delete "rv=00000111," and insert -- rv=00000111 --, therefor.

In Column 7, Line 15, delete "rv=00000011,," and insert -- rv=00000011, --, therefor.

In Column 7, Line 27, delete "v=00000010," and insert -- v=00000010 --, therefor.

In Column 7, Line 33, delete "m'=00000011," and insert -- m'=00000011 --, therefor.

In Column 7, Line 34, delete "rv=00000011,," and insert -- rv=00000011, --, therefor.

In Column 7, Line 40, delete "rv=00000110," and insert -- rv=00000110 --, therefor.

In Column 7, Line 51, delete "v=00000010," and insert -- v=00000010 --, therefor.

In Column 7, Line 52, delete "rv=00000111,," and insert -- rv=00000111, --, therefor.

In Column 8, Line 42, delete "transmitter 72." and insert -- transmitter 66. --, therefor.

In Column 8, Line 63, delete "$n^{th}$, time slot, the $j^{th}$," and insert -- $n^{th}$ time slot, the $j^{th}$ --, therefor.

In Column 9, Line 27, delete "①, to ④,," and insert -- ① to ④ --, therefor.

In Column 9, Line 31, delete "②, , ." and insert -- ②. --, therefor.

In Column 9, Line 32, delete "②, , " and insert -- ②, --, therefor.

In Column 9, Line 44, delete "11111111," and insert -- 11111111 --, therefor.

In Column 9, Line 48, delete "①, and ③,," and insert -- ① and ③ --, therefor.

In Column 9, Line 49, delete "②, and ④,," and insert -- ② and ④ --, therefor.